United States Patent [19]

Eckendorff

[11] Patent Number: 5,176,043
[45] Date of Patent: Jan. 5, 1993

[54] SYSTEM FOR ASSEMBLING A DRIVE ELEMENT CONNECTED TO A DRIVEN ELEMENT

[76] Inventor: Jean-Pierre Eckendorff, 2 rue Saint-Pierre, La Neuville 27180 Claville, France

[21] Appl. No.: 613,834
[22] PCT Filed: Jun. 2, 1988
[86] PCT No.: PCT/FR88/00276
§ 371 Date: Nov. 30, 1990
§ 102(e) Date: Nov. 30, 1990
[87] PCT Pub. No.: WO89/12179
PCT Pub. Date: Dec. 14, 1989
[51] Int. Cl.⁵ .......................... G05G 1/10; B62D 1/18
[52] U.S. Cl. .......................................... 74/552; 74/492; 74/493; 403/4; 464/160
[58] Field of Search ............... 464/160, 161, 162, 179; 74/492, 552, 493; 403/118, 343, 4, 259, 290

[56] References Cited

U.S. PATENT DOCUMENTS

| | | | |
|---|---|---|---|
| 1,490,649 | 4/1924 | Vanderbeek | 403/290 |
| 3,647,028 | 3/1972 | Platus | 74/492 X |
| 4,624,596 | 10/1986 | Eckendorff | 74/552 X |
| 4,819,961 | 4/1989 | Henigue | 74/492 X |

FOREIGN PATENT DOCUMENTS

| | | | |
|---|---|---|---|
| 1911453 | 10/1969 | Fed. Rep. of Germany . | |
| 2501513 | 7/1976 | Fed. Rep. of Germany . | |
| 558209 | 8/1923 | France | 403/343 |
| 485304 | 6/1938 | France . | |
| 148794 | 7/1985 | France . | |
| 2607564 | 6/1988 | France . | |
| 2611835 | 9/1988 | France . | |
| 244665 | 10/1986 | Japan . | |
| 509508 | 8/1939 | United Kingdom . | |
| 2063352 | 6/1981 | United Kingdom | 403/343 |

Primary Examiner—Daniel P. Stodola
Assistant Examiner—Tony A. Gayoso
Attorney, Agent, or Firm—Longacre & White

[57] ABSTRACT

A device comprising a ring coupled on its inside surface to a steering column and coupled on its outside surface to a member such as the hub of a steering wheel, the ring being adapted to be displaced in translation by means of a control member, at least one of the couplings being adapted to determine in addition to translation of the ring angular displacement of the hub relative to the steering column, the control member comprising a screw with its axis parallel to the rotation axes of the members and which, by cooperation with the ring on the one hand and the hub on the other hand, is adapted to bring about translation of the ring by virtue of commanded rotation.

24 Claims, 2 Drawing Sheets

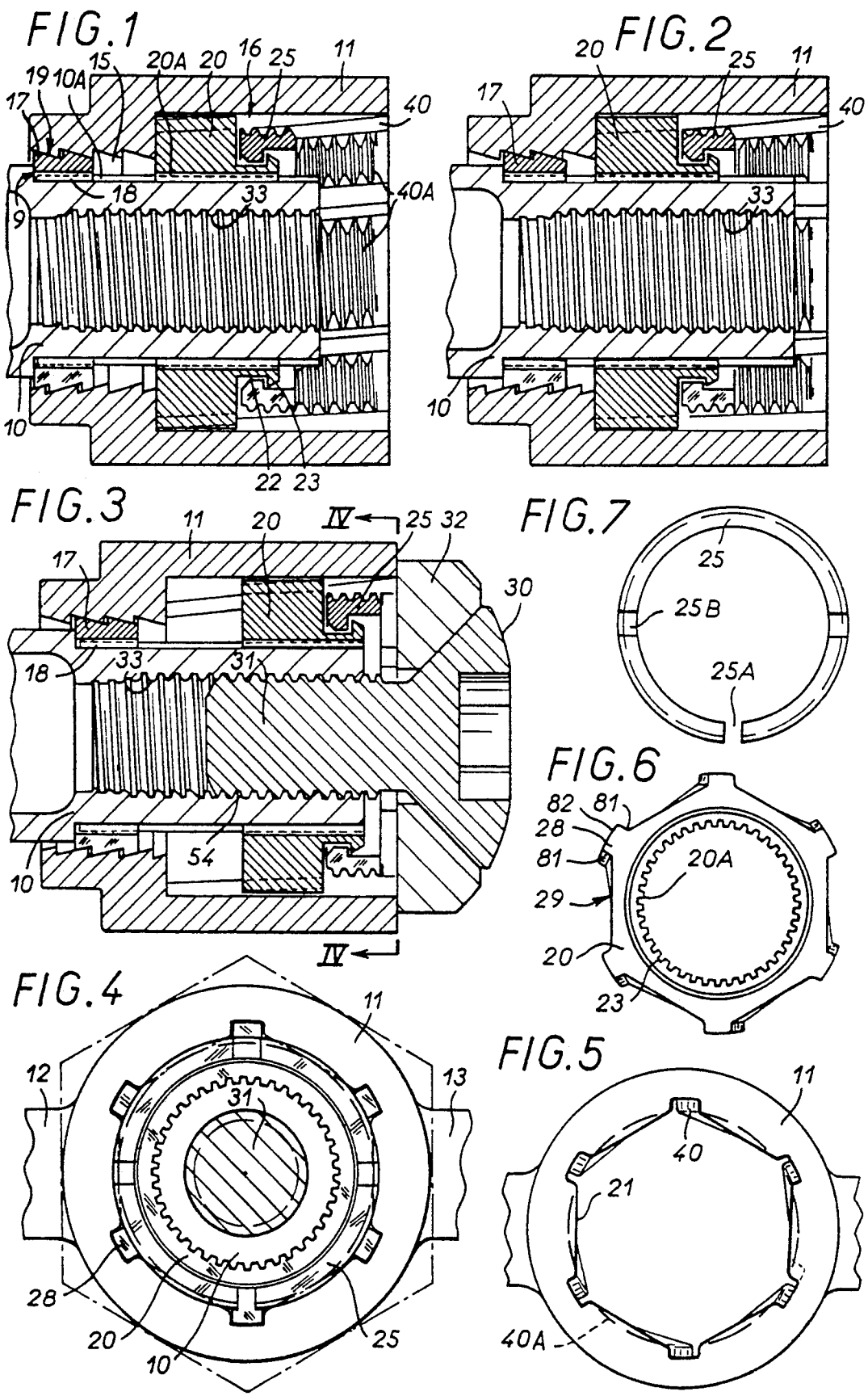

SYSTEM FOR ASSEMBLING A DRIVE ELEMENT CONNECTED TO A DRIVEN ELEMENT

The invention relates generally to a system for assembling a drive element connected to a driven element, capable of being rotated. This can be, for example, the assembly of a motor vehicle steering wheel and an associated steering column.

It is known that, in such an assembly, there can often arise the problem of adjusting the relative positions of the two elements, once assembled. This may, indeed, involve the angular relative position, on one hand and/or the axial relative position, on the other hand.

The Applicant has already described, notably in document EU-A-0 148 794, regarding an assembling system of the type in question, a device for adjusting the angular position of the driving and driven elements, including an interposed ring with respectively inner and outer surfaces including splines suitable for cooperating with complementary splines comprised by the said elements to form thus two couplings, at least one of them having helicoidal grooves. This ring was associated with a translation control means, so that a translatory movement of this ring causes one of the elements to be angularly displaced. The control means in question advantageously consisted of a screw having an axis parallel to the axes of rotation of the assembled elements and, through cooperation with the ring, on one hand, and the driving element, on the other hand, was able to ensure, through a controlled rotation, the translation of the ring.

The element bearing the ring was, for example, a motor vehicle steering column, while the other element formed the hub of the steering wheel assembled to the said column.

The control screw was advantageously annular and coaxial with the two elements, engaging, by its inner surface, with a heel provided for this purpose on an axial extension of the ring and, by its threaded outer surface, with the hub, tapped for this purpose, the steering column-ring coupling comprising rectilinear grooves, while the ring-hub coupling comprised at least one, but preferably, a series of helicoidal grooves.

The general object of the present invention is an advantageous development of thus known assembly systems, in particular in their applications to the assembly of a motor vehicle steering wheel with an associated steering column, but without any exclusion of other applications, such as, for example, the assembly of a timing gear and a cam shaft.

A more particular object of the invention is a reduction in the play liable to occur within the assembly, at the same time facilitating the manufacture and the mounting of the parts that constitute it.

Another object of the invention is the combining of the angular adjustment with an axial adjustment of the relative position of the assembled elements.

The present invention has, as a starting point, a particular form of embodiment that had proved particularly advantageous in practice among the various forms of embodiment of the aforementioned prior angular adjustment device; this is an angular adjustment ring having a generally polygonal cross-section with helicoidally developed faces cooperating with an inner surface, having a matching shape, of the driving member, in particular the hub, while the coupling of the driven member, in particular the steering column, is of the longitudinally grooved type.

Experience has shown that the angular adjustment ring thus designed, explicitly mentioned for the first time in publication JP 244665/1986 in the name of the applicant, was particularly economical to manufacture, at the same time offering easier mounting and high security.

The normal conditions for manufacturing this type of adjustment ring, using an appropriate continuous extrusion process, have revealed, however, the practical necessity of accepting tolerances liable to lead to a certain play in the coupling between the helicoidal faces and the matching inner surface of the hub. Now, this play in the coupling with the driving element, in particular a hub, is added to the existing and conventionally tolerated play in the splined coupling on the driven element, in particular a steering column.

Whence the advantage of the first specific object of the present invention consisting in reducing the play in the coupling of the adjustment ring in question with the driving element, in particular a steering wheel hub.

The means provided for this purpose by the invention is the provision, along at least some of the edges of the polygonal cross-section of the angular adjustment ring, of a radial projection presenting, between two sides of substantially radial orientation, a circular peripheral surface.

On or between at least some of the faces of the ring, there will thus be found such a radial projection joining up with a straight portion, while, on the inner surface of matching shape of the driving element (hub), a hollow moulding of corresponding cross-section will, of course, be provided opposite each radial projection of the ring, these mouldings alternating with straight faces, the whole being in helicoidal development.

The coupling thus realized between the angular adjustment ring and the driving element thus involves the cooperation of two systems of helicoidally developed bearing surfaces, on one hand, the tangentially or chordally orientated surfaces that are generated by the sides of polygonal cross-section and, on the other hand, the radially orientated surfaces that are generated by the sides of the projections. In other words, these projections form with the matching configuration of the hub a coupling of a helicoidally grooved type, while the sides of the polygonal cross-section produce a nesting coupling of the two complementary helicoidal structures.

Experience has shown that this association of two distinct types of coupling constitutes a means of reducing the play very considerably, without it being necessary to reduce the tolerances at the time of manufacturing, in particular by extrusion of a shaped piece form which the adjustment rings can be obtained simply by cutting into sections, this cutting being followed by machining of the axial extension with the heel for retaining the annular control screw.

This association further makes it possible, through a judicious choice of the radial development of the projections associated with the straight faces oft he adjustment ring, to limit the local stresses applied to the inner surface of the hub when the latter is made of a light material, for example aluminum.

The shape of the straight faces results in the tapping of the hub, designed to receive the thread of the control screw, having a particularly advantageous shape as it prevents the burrs that otherwise form during tapping.

According to another aspect of the invention, an angular adjustment device of the type under consideration is combined with a device for axially adjusting the relative position of the two assembled elements.

In the case of a driving element, such as a steering wheel hub, assembled with a driven element such as a steering column, a threaded axial adjustment ring screwed inside a tapped bore of the hub being designed to cooperate with, on one hand, a front stop of the steering column and, on the other hand, with an axial locking or fastening means, according to one form of embodiment of the present invention, the aforementioned front stop is provided on the steering column at the commencement of a free terminal portion of smaller diameter with longitudinal grooves carrying and guiding the said axial adjustment ring, followed at a certain distance by the angular adjustment ring, the hub comprising, for its part, successively a first tapped bore adapted to cooperate with the axial adjustment ring, and a second helicoidally shaped bore cooperating with the angular adjustment ring, the axial locking means comprising a screw adapted to screw into the terminal portion of the steering column and to press the hub into contact with the front stop.

According to one particularly advantageous arrangement of the invention, the axial adjustment ring comprises a buttress screw thread having an asymmetrical sawtooth profile with a substantially straight thread flank.

Furthermore, the tapped bores of the hub which are designed to cooperate, one with the axial adjustment ring and the other with the annular control screw for the axial adjustment ring, have the same pitch.

In the case of a driving element such as a steering wheel hub, assembled with a driven element, such as a steering column, having a hollow terminal portion deformable by expansion, the said means being coupled to this terminal portion by a splined assembly, this assembly is effected, in this case, according to the invention, via the angular adjustment ring, itself made inexpansible by means of a radial slit, the hub comprising here successively a smooth cylindrical bore having a diameter substantially equal to the outer diameter of the hollow terminal portion of the steering column in expanded condition, followed by the helicoidally shaped bore receiving the angular adjustment ring, the system further comprising a device for expanding the said terminal portion, designed to come into action upon the choice of the relative angular position by screwing the screw for controlling the angular adjustment ring, and then the relative axial position by sliding this ring over the grooves of the steering wheel.

Further advantages, characteristics and details will emerge from the explanatory description that follows given with reference to the annexed drawings provided by way of example and wherein:

FIG. 1 is a longitudinal cross-sectional view of a preferred embodiment of a system according to the invention for adjusting the angular and axial positions of the hub of a motor vehicle steering wheel rotationally coupled to a steering column.

FIG. 2 is a view similar to that of FIG. 1, showing the condition of the system after adjustment of the axial position of the hub;

FIG. 3 is a view similar to that of FIG. 2, showing the condition of the system after adjustment of the angular position of the hub;

FIG. 4 is a cross-sectional view along line IV—IV of FIG. 3;

FIGS. 5, 6 and 7 are detailed view showing respectively the hub, the angular adjustment ring and the annular screw for controlling it;

Figure 8:
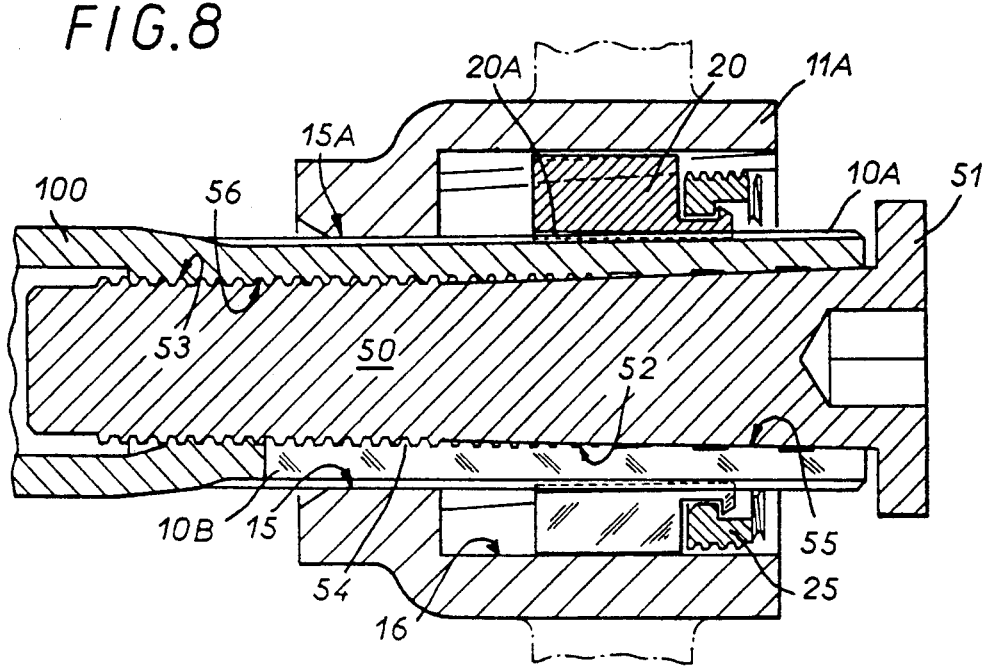
FIG. 8 is a longitudinal cross-sectional view of another example of embodiment of the combined angular and axial adjustment system.

According to the embodiment chosen and represented in FIGS. 1 to 7, reference number 10 designates the terminal portion of the steering column of a motor vehicle comprising, in the usual manner, rectilinear splines 10A, 40 in number, for example, regularly spaced over its outer periphery and an inner thread 33 designed to receive thread 31 of a locking or fastening means 30. Reference number 11 designates a steering wheel hub connected to the wheel member of the steering wheel (not represented) via, for example, two diametrical arms 12, 13 partially represented in FIG. 4.

Reference 17 designates a split elastic metallic ring. Its inner surface has a series of rectilinear splines 18 equal in number and able to engage the splines 10A of steering column 10. The outer surface of this ring 17 includes a thread 19 having an asymmetrical buttress teeth, and more precisely a thread one of the thread flanks is substantially perpendicular to the axis of split ring 17. The other flank is inclined, for example, at an angle of 12° to 15° in relation to the axis of ring 17.

A cylindrical bore 15 of hub 11 is tapped in a manner complementary to the thread of ring 17.

A stop 9 having a plane contact surface, perpendicular to the axis of the column, is defined in the form of an annular shoulder between the central portion of the column and its smaller diameter end portion, and cooperates with the end of split ring 17 to determine the axial position of hub 11 on column 10.

Reference number 20 designates the adjustment ring for adjusting the angular position of hub 11 on column 10. Its outer surface has a cross-section of generally polygonal, helicoidally developed shape as can be seen from FIG. 6, the straight, tangentially or chordally orientated faces 29 of which are completed by radially orientated projections 28 delimited by substantially radial sides 81 and a substantially circular peripheral end 82.

Adjustment ring 20 is fitted, on one hand, onto column 10 and rendered rotationally integral with this column by means of splines 20A and 10A and, on the other hand, inside a bore 16 the inner surface of which has a moulded helicoidal shape complementary to the outer shape of adjustment ring 20. Axial displacement of this adjustment ring 20 causes angular displacement of hub 11: it is thus possible to define continuously and precisely the angular position of hub 11 on column 10 by adjusting the axial position of adjustment ring 20 inside bore 16.

The axial position of adjustment ring 20 inside bore 16 is controlled by screwing a control ring 25 in a thread 40A tapped in the faces 21 of the inner surface of this bore.

Control ring 25 (FIG. 7) is split at 25A and is coupled axially by its inner surface to ring 20 and is movable in rotation thereto. This coupling includes an annular heel 22 which axially extends ring 20.

This heel 22 has a peripheral shoulder 23 onto which control ring 25 clips owing to the elasticity imparted to it by its split 25A. Its outer surface is provided with a thread suitable for engaging the tapped portions 40A of faces 21 of bore 16 in hub 11.

Control ring 25 comprises notches 25B enabling it to be driven by a suitably shaped spanner of wrench.

Experience has shown that the association, in the outer surface of adjustment ring 20 and in the complementary surface of bore 16, of a helicoidal structure with tangential or chordally faces 29 with a helicoidal structure with ribs 28 makes it possible to have considerably reduced play without having recourse to tolerances that are too difficult to observe economically.

In particular, the body of adjustment ring 20 can be cut out of a drawn blank bar of a suitable profile. It can also be obtained by casting, particularly in sintered material.

Another advantage of this arrangement is that the stress exerted by adjustment ring 20 upon the mating surfaces of bore 16 can be reduced: indeed, by increasing the height of the radial sides 81, their surface area is increased. This makes it possible to reduce the specific pressure exerted upon the material of the hub and, in particular, to give it a value compatible with the use of light metals such as aluminum for producing the hub.

The tapped thread 40A in hub 16 covers only plane surfaces, complementary with the faces 29 of control ring 25; as a result, the sections of thread 40A naturally end in a tapered shape, which prevents burring during tapping and simplifies the manufacturing process, at the same time making it possible to preserve all of the supporting surfaces offered by the configuration.

As shown in FIG. 5, the depth of the internal threading 40A of hub 11 in the chordal segments or faces 21 tapers circumferentially outwardly. This depth is shown by the dashed lines of FIG. 5. This configuration serves to avoid the formation of burrs which otherwise would hinder the axial displacement of the adjustment ring along the helical splines.

The operation of such a system will now be described.

Initially, the split ring 17 is assembled in bore 15 of hub 11, and adjustment ring 20 associated with its control ring or element 25 in bore 16 of hub 11. Split ring 17 is screwed into bore 15, by means of a suitable spanner, until it reaches, for example, the position represented in FIG. 1. It is advisable to deform or flatten at least the last thread of the tapped portion of the bottom of split bore 15 to limit the travel of ring 17, and thus to prevent it from penetrating the second bore 16. The deforming or flattening of this last thread is to be done in such a way that it will maintain split ring 17 at a distance greater than due to the slight recoil at the time of final locking, without thereby impairing its blocking effect on column 10 or coming into contact with adjustment ring 20. Once split ring 17 is thus positioned, the first thread of the tapped portion at the entry to bore 15 is caulked flattened in order thus to imprison the ring captive between two end positions.

Adjustment ring 20 and its associated control element 25 are freely introduced into bore 16 of the hub 11, just to the point control element 25 engages the tapped portions 40A of the bore. Then, through rotation of control element 25, adjustment ring 20 is displaced in bore 16 to position represented in FIG. 1; the first thread or bore 16 is then deformed or flattened to make it impossible to dismantle the system.

In a second stage, the hub 11, with split ring 17 and adjustment ring 20 associated with its control ring 25 thus assembled, is engaged from the rear, corresponding to the end with bore 15, on the terminal portion of column 10, the splines of rings 17, 20 engaging splines 10A of the column. Hub 11 is moved along column 10 until the front face of split ring 17 comes to bear against shoulder 9 of column 10.

This position defines an initial axial position of hub 11 in relation to column 10, in fact the position the furthest away from the dashboard. If this position is not the desired one, with reference notably to the dashboard of the vehicle, this position is adjusted as described below.

Hub 11 is disengaged from column 10 and, by means of a spanner or wrench introduced into splines 18, split ring 17 is rotated to adjust its position forwardly inside bore 15. Then, hub 11 is again engaged on column 10 located in the position represented in FIG. 2, which is assumed to correspond to the desired position of axial adjustment.

Each revolution of split ring 17 in bore 15 in one direction or the other will have the effect of modifying the axial position of the hub by a value corresponding to the pitch of thread 19, by 2 millimeters for example, either in the direction of approach the dashboard or in the opposite direction.

It should be noted that the position of stop 9 on column 10 is determined so that, in the two end positions of split ring 17 in bore 15, the terminal end of column 10 never projects beyond the front face of hub 11.

In a third stage, the angular position of hub 11 is adjusted in relation to column 10, in order to position the lateral arms 12,13 of the steering wheel in a horizontal plane.

This adjustment is carried out by rotating control ring 25 by means of a suitable spanner or wrench introduced into notches 25B, hub 11 remaining in the position represented in FIG. 2. The result of this rotational movement is to drive adjustment ring 20 for translatory movement, the control 20 ring being held against rotation by its engagement with splines 10A of column 10. This translatory movement of adjustment ring 20 imparts a rotary movement to hub 11, given the cooperation between the helicoidal surfaces of adjustment ring 20 and bore 16. FIG. 3 illustrates the relative position of the relevant parts, once angular adjustment has been completed.

It will be noted that these two adjustments, of the axial position, on one hand, and of the angular position, on the other hand, are effectively independent of one another bearing in mind the slight angular adjustment which gives rise to negligible displacement.

Finally, in a fourth stage, the system is locked, in particular axially locked for the purpose of immobilizing split ring 17 on column 10.

Locking or fastening device 30 is essentially consists of a screw 31 which, extending through a washer 32, is screwed into the internally tapped terminal portion 33 of column 10. Alternatively, locking can be ensured by a nut screwed onto a threaded terminal portion of the column.

Washer 32 comes to bear against the outer frontal surface of hub 11, the tightening of split screw 31 resulting in the radial tightening of ring 17 on grooves 10A of column 10, and the axial tightening of this same ring 17 against stop 9.

During the tightening operation, the elasticity of split ring 17 and the supporting effect produced by the conical surfaces formed by the inclined flanks of threaded portion 19, ensure a further tightening of the ring on grooves 10A of column 10, with the particular effect of limiting the contact pressure of split ring 17 on stop 9. Furthermore, the elasticity of split ring 17 makes it possible to obtain a continuous circumferential contact surface between all of the threads of threaded portion 19 and the corresponding threads of the tapped portion of bore 15 of hub 11.

The preferred embodiment as described above, or any other equivalent embodiment, can present a number of complementary features.

Hub 11 can have an outer surface of a polygonal shape and preferably a hexagonal shape to facilitate the welding of arms 12,13 of the steering wheel in all positions that might be necessary, as indicated in dot and dash lines in FIG. 4.

The tapped portions of bores 15, 16 of hub 11 can advantageously have the same pitch, 2 mm for example, to enable them to be produced, with perfect concentricity, in a single operation using a suitable tool.

Finally, hub 11 can advantageously be made of aluminum with the polygonal profile following a helicoidal path of its bore 16 produced during the hub moulding or drawing operation.

FIG. 8 is a longitudinal cross-sectional view of another embodiment of the invention for the assembly of a motor vehicle steering wheel on a steering column.

The terminal portion of steering column 100 is hollow and has a slit 10B extending parallel to splines 10A so as to be elastically deformable in a radial direction under the effect of an expansion means 50.

Figure 9:
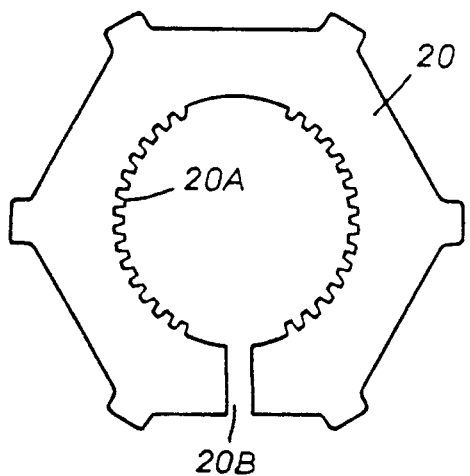
FIG. 9 is a detailed view of the annular adjustment ring of FIG. 8.

Hub 11A has, towards its rear end facing the dashboard and the main body of column 100, a cylindrical bore 15A. After this bore comes a bore 16 suitable for receiving the angular adjustment device of the type already described. However, in this embodiment, the angular adjustment ring 20 is split at 20B so as to be elastically deformable, as indicated in FIG. 9, from which will be noted, moreover, the absence of inner grooves 20A in the vicinity and on either side of slit 20B adjustment ring 20, as well as in the portion diametrically opposed to slit 20B.

In this example, the means for expanding column 100 and locking the axial position of hub 11 on this column is constituted by a screw 50 having a generally conical shape which, once it is engaged in the hollow end of column 100, cooperates with the inner wall of the latter, machined according to a complementary profile.

More precisely, screw 50 is formed of three portions: a screw head 51 projecting at the terminal end of column 100, a portion 52 of the screw shape having a frustonical shape prolonged by a terminal portion 53 having a shape provided with a threaded portion 54 on its periphery.

In a complementary manner, the inner wall of the hollow terminal end of column 100 is machined so as to present, starting from the end of the column, a bore 55 of a conical shape prolonged by a bore 56 having a cylindrical shape. Conical bore 55 extends over a length substantially equal to that of portion 52 of screw 50.

Finally, the cylindrical bore 56 that prolongs conical bore 55 is tapped to cooperate with threaded portion 53 of screw 50, the resulting tapped portion continuing, if necessary, over the conical bore 55 to permit the passage of screw 50.

Hub 11A is assembled on column 100 in the manner described below.

In an initial stage, adjustment ring 20 associated with its control ring 25 is positioned opposite bore 16 with its slit 20B located preferably along a vertical axis and introduced freely into bore 16 of hub 11A until the threaded portion on the outer periphery of control element 25 engages in the tapped portions 40A of faces 21 of bore 16. Then, through rotation of control element 25 by means of a suitable spanner, adjustment ring 20 is, for example, displaced right to the end of bore 16.

In a second stage, the assembly composed of hub 11A and ring 20 coupled to its control element 25, is engaged by bore 15 over the terminal portion of column 100, in such a way that slit 20B of the ring is substantially opposite a slit 10B of the column.

Hub 11A is moved along column 100 until it reaches a position that separates it from the dashboard of the vehicle by a predetermined distance. This position can be defined, for example, by means of a removable wedge (not shown) placed between the dashboard and the end surface adjacent to hub 11A.

Once hub 11A has been axially positioned, it is preferable not to proceed immediately to adjust the angular position.

Thus, in a third stage, the lock screw 50 is freely introduced inside column 100, until its threaded end 53 engages the tapped portion of cylindrical bore 56 of column 100. Then screw 50 is pre-tightened until its conical portion 52 forming a tightening cone comes to bear on the conical bores 55 of column 100. The advance of screw 50 with the cooperation between the conical faces of screw 50 and column 100, leads to a radial expansion of column 100 rendered elastically deformable by the presence of slot 10B. This radial expansion leads to a interpenetration of splines 20A of the ring and splines 10A of column 100.

The purpose of this pre-tightening is to remove the play inevitably existing between splines 10A, 20A, without thereby locking the position of ring 20, which must remain capable of translatory movement to permit angular adjustment of hub 11A.

In a fourth stage, hub 11A is angular adjusted. Rotation of control element 25 by means of a suitable spanner engaged in the notches drives adjustment ring 20, which is fixed against rotation, in a rotary movement of hub 11A, until it reaches, for example, the position represented in FIG. 8.

In a fifth, and final, stage, hub 11A is finally axially immobilized on column 100 by additional tightening of screw 50, leading to further expansion. This expansion of the terminal portion of column 100 leads, on one hand, to an increasingly tight fit between splines 20A of adjustment ring 20 and splines 10A of column 100 and, on the other hand, to radial expansion of adjustment ring 20, which comes into tight contact by its outer peripheral surface with the inner wall of bore 16 of hub 11A. Ring 20, thus blocked between column 100 and hub 11A, ensures the axial immobilization of the latter on column 100.

This immobilization is all the more efficient in that slit 20B of adjustment ring 20 is located substantially opposite a slit 10B of column 100 and that adjustment ring 20 presents no grooves in the vicinity of slit 20B, so as to achieve almost total expansion of adjustment ring 20, increasing by as much its surface of contact with hub 11A.

The diameter of bore 15 of hub 11A is determined in such a way that, in the system locking position, the wall of bore 15 is substantially in contact with splines 10A of column 100 to avoid any possibility of deformation by torsion or development of the system thus assembled.

It emerges from the aforegoing that adjustment ring 20 of the device for angular adjusting hub 11A performs three functions, while ensuring independence between axial positioning and angular adjustment. The first function is performed by grooves 20A of adjustment ring 20 which allow hub 11A to be mounted on column 100 and axially displaced until it reaches the desired position. The second is that of enabling hub 11A to be angularly adjusted by its translatory movement inside the hub. Finally, the third function is that of ensuring the immobilization of the hub under the control of locking screw 50.

In the event of incomplete tightening of screw 50, it is impossible for steering wheel 11A to become disengaged from column 100 since, in such a movement, hub 11A would displace adjustment ring 20 until it abuts against screw head 51, the diameter of which is greater than the inner diameter of the ring. Thus, ring 20 associated with screw 50 performs an additional safety function.

In the example described, the threaded portion 53 of screw 50 is located at its inner end engaged in column 100 and in the prolongation of the conical portion 52 of the screw. Conversely, the conical portion 52 of screw 50 can be located towards the inner end of the screw and in the prolongation of the threaded portion 53.

Other modes and means for causing the expansion of column 10 can be used.

Figure 10:
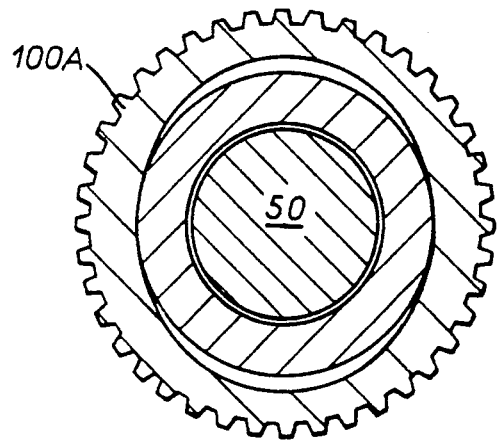
FIG. 10 is a cross-sectional view of another form of expansible terminal portion of steering column.

FIG. 10 shows in transverse cross-section an embodiment wherein the expansion of column 10A is rendered possible by giving the section of the hollow portion a variable radial thickness. The introduction into such a hollow portion of an expansion and locking means analogous to screw 50 causes the radial deformation and, consequently, the expansion of the column.

Figure 11:
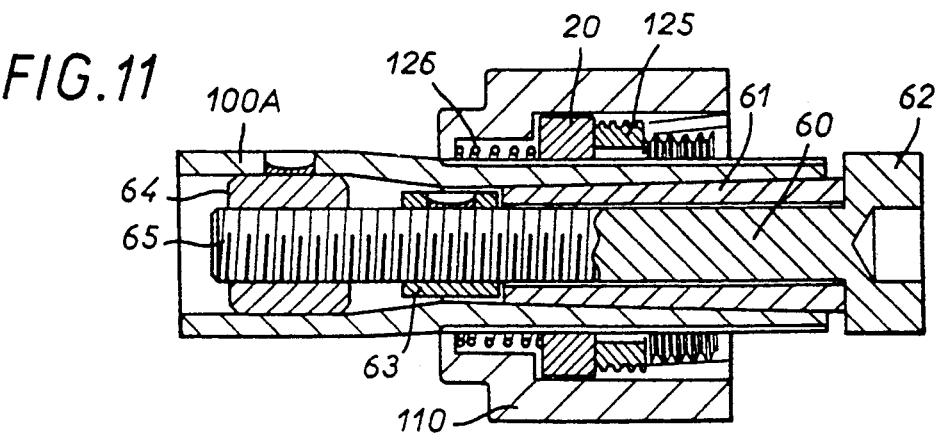
FIG. 11 is a view similar to that of FIG. 9, showing a variant.

FIG. 11 shows in longitudinal cross-section an example of an embodiment wherein the locking element is, for example, constituted by a screw 60 ending in a threaded portion 65. The portion of the screw forming a tightening cone 61 is formed by an expansion cone loosely inserted around the cylindrical body of the screw between the screw head 62 and an extraction ring 63 rendered integral with the screw. The functional of this ring, in addition to that of axially retaining the expansion cone 61, is to drive this cone simultaneously back from during dismounting of the steering wheel.

The threaded end portion of screw 60 engages in a tapped portion of a nut 64 mounted here inside the column and rendered integral therewith. Alternatively, the threaded end portion 65 of the screw can engage in a tapped bore of a solid portion of the column.

The mode of expansion represented in FIG. 11 can be used in one or the other of embodiments illustrated in FIGS. 8 and 10.

FIG. 11 also shows an alternative embodiment of the angular adjustment according to the invention. In this embodiment, the means of controlling angular adjustment ring 20 is constituted by an annular screw 125 which simply bears against the front face of adjustment ring 20, while the opposite face thereof is placed in contact with a support spring 126 incorporated in a housing provided for that purpose in hub 100.

The invention is not, of course, in any way limited to the particular application thereof that has been described by way of example to the mounting of a motor vehicle steering wheel. The system can be applied advantageously to the assembly of any driving element with a driven element whenever there can be a problem of precise, reliable adjustment of the relative positions of these elements in an axial and/or angular direction. Another area of application of interest can be found, for example, in the adjustment of cam shafts.

The invention is not limited, either, to the details of the forms of embodiment above described by way of illustration. With regard to axial adjustment, in an embodiment of the type illustrated in FIG. 1 to 3, the bearing face 9, instead of being straight, could, of course, be constituted by the conical face often available on certain steering columns.

I claim:

1. System for assembling a driving element and a driven element with means for angularly adjusting the relative position of said driving and driven elements, said means for angularly adjusting comprising an angular adjustment ring cooperating with means for controlling axial displacement of said adjustment ring along splines for coupling said adjustment ring and said driven element, said means for controlling axial displacement comprising an externally threaded control ring, said adjustment ring having an outer surface with a generally polygonal cross section including helically extending faces, said outer surface being co-operable with a complementarily shaped inner surface of said driven element, some of said faces defining (i) at least one radial projection, the at least one radial projection comprising pairs of opposed substantially radially oriented sides and a part-circular peripheral surface extending between said opposed sides, and (ii) a substantially straight line chordal segment, said complementary shaped inner surface having a chordal segment being internally threaded and complementary to said externally threaded control ring.

2. System according to claim 1, wherein said control ring is a split ring for elastically clearing a radial shoulder on an axial extension of said adjustment ring.

3. System according to claim 2, further comprising means for adjusting the axial position of a hub on a steering column, comprising a threaded ring threadedly engaged with a complementarily threaded bore in said hub, said threaded ring cooperating with both an abutment on said steering column defined by an annular shoulder immediately adjacent a smaller diameter portion having corresponding ones of said splines and fastening means for immobilizing the threaded ring on said steering column.

4. System according to claim 2, further comprising means for adjusting the relative axial position of a hub on said steering column, said column having a terminal recess, an expansion member received in said recess for radially expanding said steering column and locking said adjustment ring on said steering column, said adjusting ring comprising a split ring radially expandable in response to radial expansion of said steering column, said hub being integrally fixed to said steering column by said expansion member.

5. System according to claim 1, wherein said control ring bears against a first face of said adjustment ring, a support spring bearing against a second face of said adjustment ring opposite said first face.

6. System according to claim 5, further comprising means for adjusting the axial position of a hub on a steering column, comprising a threaded ring threadedly engaged with a complementarily threaded bore in said hub, said threaded ring cooperating with both an abutment on said steering column defined by an annular shoulder immediately adjacent a smaller diameter portion having corresponding ones of said splines and fastening means for immobilizing the threaded ring on said steering column.

7. System according to claim 5, further comprising means for adjusting the relative axial position of a hub on said steering column, said column having a terminal recess, an expansion member received in said recess for radially expanding said steering column and locking said adjustment ring on said steering column, said adjusting ring comprising a split ring radially expandable in response to radial expansion of said steering column, said hub being integrally fixed to said steering column by said expansion member.

8. System according to claim 1 wherein said driving element is a hub of a motor vehicle steering wheel and the driven element is a motor vehicle steering column.

9. System according to claim 1 wherein the depth of the internal threading of the chordal segment tapers circumferentially outward.

10. System for assembling a hub of a motor vehicle steering wheel and a motor vehicle steering column with means for angularly adjusting the relative position of said hub and said steering column, said means for angularly adjusting comprising an angular adjustment ring cooperating with control means for controlling axial displacement of said adjustment ring along splines for coupling said adjustment ring and said steering column, said adjustment ring having an outer surface with a generally polygonal cross section including helically extending faces, said outer surface being co-operatable with a complementarily shaped inner surface of said hub, at least some of said faces defining a radial projection comprising a pair of opposed substantially radially oriented sides, a part-circular peripheral surface extending between said opposed sides, and a generally chordal segment, and means for adjusting the axial position of the hub on said steering column, comprising an axially adjustable threaded ring threadedly engaged with a complementarily threaded bore in said hub, said threaded ring cooperating with an abutment on said steering column defined by an annular shoulder immediately adjacent a smaller diameter portion in which is formed corresponding ones of said splines and fastening means for immobilizing threaded ring on said steering column.

11. System according to claim 10, wherein said threaded ring comprises a split ring.

12. System according to claim 10, wherein said threaded ring has asymmetrical buttress teeth, including at least one substantially straight flank.

13. System according to claim 12 wherein said adjustment ring is devoid of splines adjacent to and to either side of a slit defining its split configuration.

14. System according to claim 10, wherein said hub comprises in succession a first, threaded bore co-operatable with said adjustment ring a second, helical bore co-operatable with said adjustment ring and including threaded portions.

15. System according to claim 14 wherein said first and second bores have threaded portions of the same pitch, of the order of 2 mm.

16. System according to claim 10, wherein fastening means comprises a tightening washer bearing against a front end of said hub, spaced from said steering column and a threaded fastener threadedly engaged in a hollow threaded end of said steering column.

17. System according to claim 10, wherein said threaded ring has buttress asymmetrical teeth, including at least one substantially straight flank.

18. System for assembling a hub of a motor vehicle steering wheel and a motor vehicle steering column with means for angularly adjusting the relative position of said hub and steering column, said means for angularly adjusting comprising an angular adjustment ring cooperating with means for controlling axial displacement of said adjustment ring along splines for coupling said ring and said steering column, said adjustment ring having an outer surface with a generally polygonal cross section including helically extending faces, said outer surface being co-operatable with a complementarily shaped inner surface of said steering column, at least some of said faces defining, a radial projection comprising a pair of opposed substantially radially oriented sides, a part-circular peripheral surface extending between said opposed sides, and a generally straight-line chordal segment, and comprising means for adjusting the relative axial position of said hub on said steering column, said column having a terminal recess, an expansion member received in said recess for radially expanding said steering column and locking said adjustment ring on said steering column, said adjusting ring comprising a split ring radially expandable in response to radial expansion of said steering column, whereby said hub is integrally fixed to said steering column by said expansion member.

19. System according to claim 18, wherein the expansion member comprises a threaded cylindrical terminal portion axially remote from an axially movement of said steering column, said steering column having a complementarily threaded cylindrical portion threadedly engaged with said terminal portion.

20. System according to claim 19, wherein upon expansion of said steering column by said expansion member, a cylindrical bore in said hub substantially comes into mating contact with splines of said steering column, said hub having in succession a smooth bore having diameter substantially equal to an outer a diameter of said terminal portion of said column in its expanded condition and a helically shaped bore coupled to said angular adjustment ring.

21. System according to claim 19, wherein said expansion member includes a head having an abutment face for preventing disassembly in the event of improper tightening.

22. System according to claim 19, said steering column at the level of said terminal recess has a slit extending parallel to said grooves.

23. System according to claim 19, wherein said steering column has a variable radial thickness for permitting deformation by said expansion member.

24. System according to claim 18, wherein said expansion member has a cylindrical body rotatable inside an intermediate body having a gradually axially variable cross section, said intermediate body in said steering column causing expansion of said steering column under the action of said expansion member.

* * * * *